United States Patent [19]
Blevins

[11] Patent Number: 5,272,324

[45] Date of Patent: Dec. 21, 1993

[54] PORTABLE SCANNER SYSTEM WITH TRANSCEIVER FOR TWO-WAY RADIO FREQUENCY COMMUNICATION

[75] Inventor: Ronald L. Blevins, Maumee, Ohio

[73] Assignee: Interlink Technologies, Inc., Maumee, Ohio

[21] Appl. No.: 959,481

[22] Filed: Oct. 9, 1992

Related U.S. Application Data

[63] Continuation of Ser. No. 565,653, Aug. 10, 1990, abandoned.

[51] Int. Cl.⁵ ............................................. G06K 7/10
[52] U.S. Cl. ................................. 235/462; 235/472; 235/385
[58] Field of Search ............... 235/470, 472, 462, 385, 235/383, 375, 378, 145 R; 200/DIG. 2

[56] References Cited

U.S. PATENT DOCUMENTS

| | | | |
|---|---|---|---|
| 3,876,863 | 4/1975 | Boone | 235/385 |
| 3,978,318 | 8/1976 | Romeo et al. | 235/472 |
| 4,593,186 | 6/1986 | Swartz et al. | 235/472 |
| 4,628,193 | 12/1986 | Blum | 235/375 |
| 4,766,299 | 8/1988 | Tierney et al. | 235/472 |
| 4,916,441 | 4/1990 | Gombrich | 235/462 |
| 4,935,610 | 6/1990 | Wike | 235/462 |
| 4,939,514 | 7/1990 | Miyazaki | 235/145 R |
| 4,970,379 | 11/1990 | Danstrom | 235/462 |
| 5,023,438 | 6/1991 | Wakatsuki et al. | 235/472 |
| 5,065,003 | 11/1991 | Wakatsuki et al. | 235/472 |
| 5,157,687 | 10/1992 | Tymes | 235/472 |

*Primary Examiner*—Robert A. Weinhardt
*Attorney, Agent, or Firm*—Marshall & Melhorn

[57] ABSTRACT

A hands free radio frequency terminal is worn on the body of the user. Components comprised of bar code scanner, key pads for communicating with a computer and LCD/LED display are attached to a sleeve device detachably worn on the forearm, and includes a switch for operating the scanner that is worn across the palm of the hand on a stirrup device. A power pack and radio frequency transceiver is worn on the torso of the user and is interconnected by conductors to the components. The RF transceiver has communication with a host computer.

17 Claims, 4 Drawing Sheets

PORTABLE SCANNER SYSTEM WITH TRANSCEIVER FOR TWO-WAY RADIO FREQUENCY COMMUNICATION

This application is a continuation of U.S. patent application Ser. No. 07/565,653, filed Aug. 10, 1990 and now abandoned.

FIELD OF THE INVENTION

The present invention relates to computer scanner systems used to read and store information on bar codes; and more particularly, to the mounting of scanner and other components of such a system.

BACKGROUND OF THE INVENTION

Warehouse inventory and routing of merchandise is being accounted for presently by bar code scanners connected with a remote portable terminal that is in radio communication with a base station computer interface unit connected with a host computer. Presently, the portable terminals are mobile types that are either mounted on a vehicle, such as a fork lift truck used in the warehouse; or are hand held terminals carried by the operator. A hand held scanner unit is connected to the mobile terminal for input and is used by the operator to scan bar symbols on the merchandise in the warehouse that is either going into storage, that is in storage, or is going out of storage.

The prior art systems of this type require an operator to use one or both hands to operate the scanning equipment and the terminal. Yet, the operator often has a need to use his hands for other duties, such as to steer or operate a lift truck or vehicle during a time the scanning and terminal operation is being undertaken.

SUMMARY OF THE INVENTION

It is, therefore, an important object of the invention to provide a means for mounting the scanner and necessary parts of the remote radio frequency terminal on a body member of the operator, such as his or her forearm, in a functional mode so as to free both hands of the operator for other uses.

A fundamental object of the invention is to provide a forearm base mount for a scanner and one or more components of the radio frequency terminal components; and to provide an accessible switch for operating the scanner by a digit of the hand.

In one form of the invention, a base mount that conforms to the contour of a human forearm is fitted and held on the arm of the operator by encircling the arm. The base mount includes means on the surface for attaching segments or pads of the terminal for data entry or operational keyboard, for attaching a laser scanner unit that reads bar codes on articles in the warehouse, and for attaching a liquid crystal display (LCD) or light emitting diode (LED) display area. All of the components are operatively connected together and to a battery pack and radio transmitter which communicates with a host computer in the known manner.

Another form of the invention provides a sleeve as the base mount for the aforementioned components that is worn over the forearm of the operator and has a stirrup at the far end of the sleeve which fits over the thumb and around the palm of the hand to hold the sleeve in place. The switch for activating the scanner and circuits of the radio transmitting terminal is situated on the stirrup for operation by a finger (or thumb) of the same hand.

A further form of the invention provides a means for attaching the components of the system on the arms base mount by a holder bracket that conforms to the exterior of the mount and is detachably fastened thereon.

And, another form of the invention provides a "Velcro" attachment of the components to the arm base mount by fastening hook material onto an area of one member and an area of loop material onto the other.

It is a further objection of the invention to provide the scanner and segments or pads of the terminal for hand operation that are fastened onto the arm base mount for operational functions of the scanner, terminal and for LCD/LED display of the system, these components being arranged on the arm mount for convenient use by the operator. Other portions of the system, such as the battery pack, radio transmitter and antenna are attached elsewhere on the body of the operator such that he or she has complete mobility.

Further objects, features and other aspects of the present invention will be understood from the following detailed description of the preferred embodiment of the invention with reference to the accompanying drawings.

DETAILED DESCRIPTION OF THE INVENTION

Figures 1, 2:
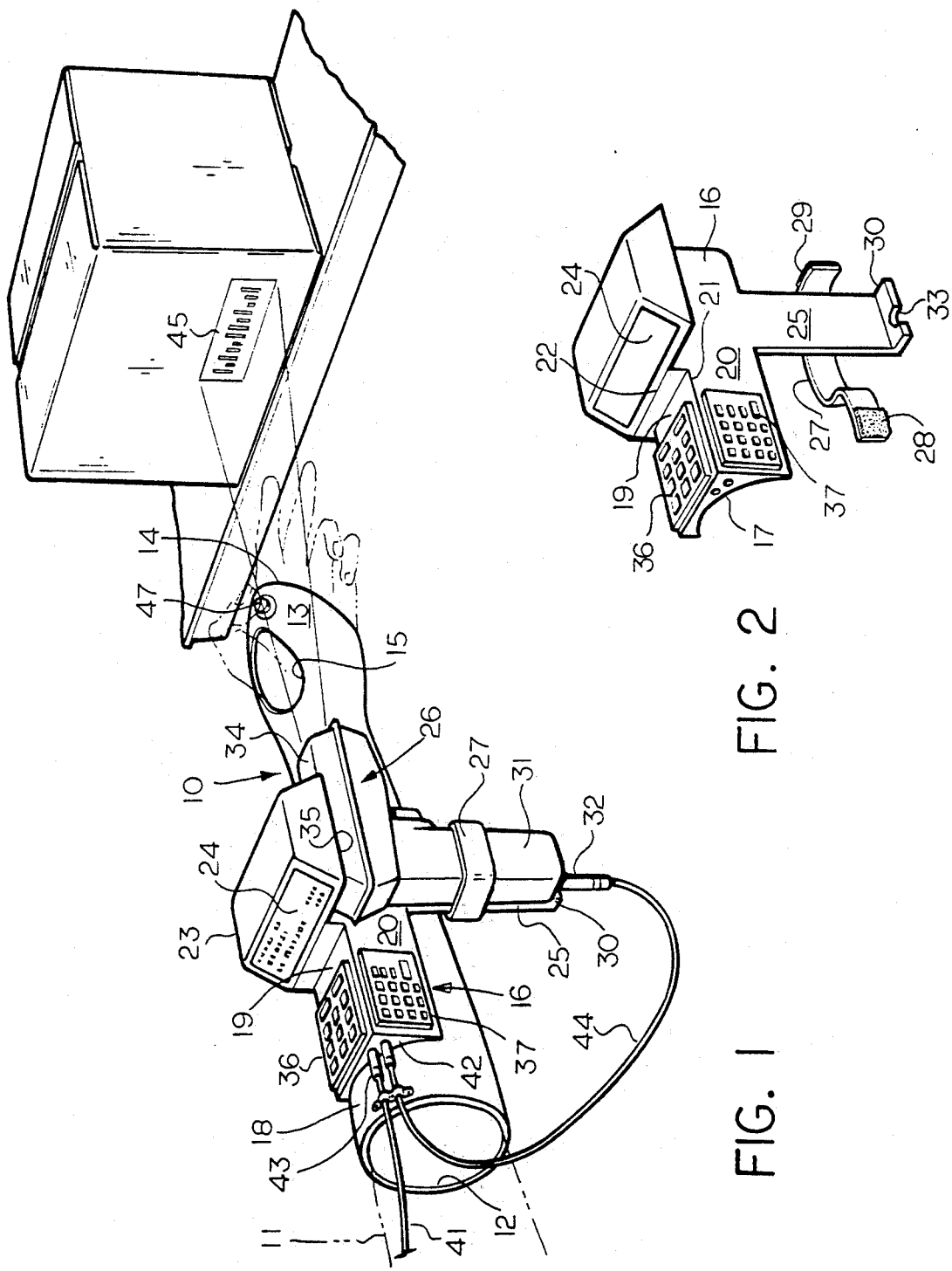
FIG. 1 is a perspective view showing an embodiment of the arm support of the present invention used for scanning a bar code of a package.
FIG. 2 is a perspective view of the frame for attaching the key pads and scanning gun to the arm support of FIG. 1.
Figure 3:
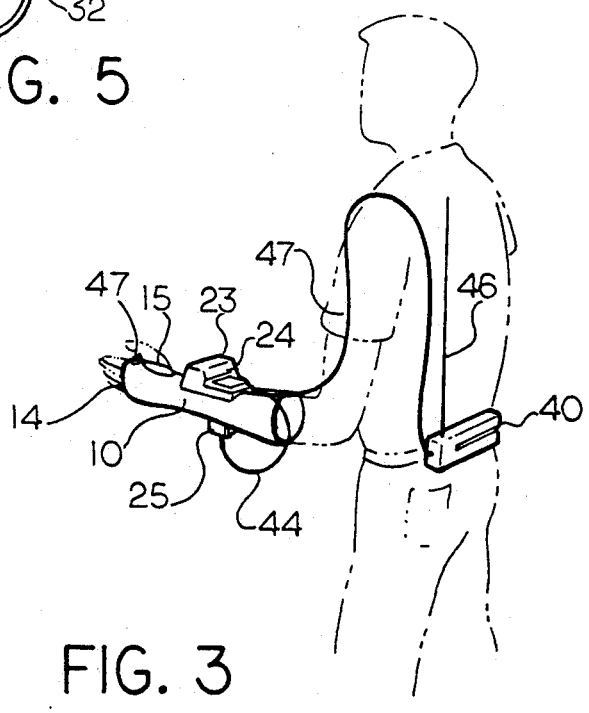
FIG. 3 is a perspective view showing the invention on the arm of the user (in phantom outline) and coupled with a radio transmitter and battery pack that is supported on the back of the user.

Referring to the drawings, FIGS. 1-3 illustrate a preferred embodiment of the invention. The base support element 10 of the scanner terminal system is a hollow sleeve element that is made to conform to the shape of a forearm 11 of the user/operator. The base support element 10 is constructed of a pliable material that will conform to the forearm; examples of which may be a durable fabric such as naugahyde, leather, plastic impregnated fabric as a fiberglass impregnated fabric, canvas or the like. Support base element 10 has an enlarged opening 12 at one end into which the hand and arm 11 is inserted. The opposite longitudinal end 13 of the element 10 is open as defined by the perimeter 14, and a thumb opening 15 near the end 13 will receive the thumb. The perimeter 14 of element 10 encircles the hand and extends across the palm. The fingers and thumb of the hand protrude from the end 13 of the support element 10 and are free for use by the operator in performing other functions. The components of the bar scanner terminal system are supported on a frame 16 (FIG. 2) that includes a contoured back surface 17 that will conform to the outer surface 18 of support element 10. Frame 16 includes a flat top surface 19 and a flat side surface 20; the surfaces 19 and 20 being joined at an edge 21. The forward part of the frame includes a raised top surface 22 on which a liquid crystal display or light emitting diode display (LCD/LED) tube 23 is fastened in place. The LCD/LED unit 23 may be attached to raised surface 22 by adhesive or screws or similar suitable means so that the viewing area 24 is facing the sight of the user (FIG. 1). LCD/LED unit 23, as is shown on FIGS. 1 and 2, extends laterally beyond the surface 22 providing a surface 35. A downward leg 25 of the frame 16 lies flush with surface 20. A bar scanner 26 will be mounted on leg 25 and secured by strap 27 which has a J-hook area 28 at one end portion thereof and a loop fabric area 29 at its opposite end portion so that the hook and loop areas face each other. When joined one on the other these areas fasten as a Velcro fastener. The bottom end portion of leg 25 has a laterally outwardly extending ledge 30. Bar scanner unit 26 may take one of several forms of wand type scanner, an example of such is sold by Symbol Technologies of Bohemia, N.Y. There are two types of scanners in use today that are made and sold by Symbol Technologies; either of which will be satisfactory. These scanners are the Visible Laser Diode Series (VLD) and Infrared Series (IR). The lower grip 31 of the scanner 26 is laid alongside the flat surface of leg 25 of the frame. The power connector housing 32 protrudes from the bottom end of grip 31 and the notch 33 in the ledge 30 of leg 25 receives housing 32. The top surface 34 of the scanner unit fits snugly under the overhanging surface 35 of the VFD unit 23, the lower surface of grip 31 fits snugly on the ledge 33 and strap 27 is closed to mount scanner 26 firmly in position on frame 16.

Frame 16 is attached to the outer surface 18 of the arm support element 10 by suitable means, an example of which is illustrated as a Velcro coupling between the surface 18 and matching surface 17 of frame 16.

Figure 10:
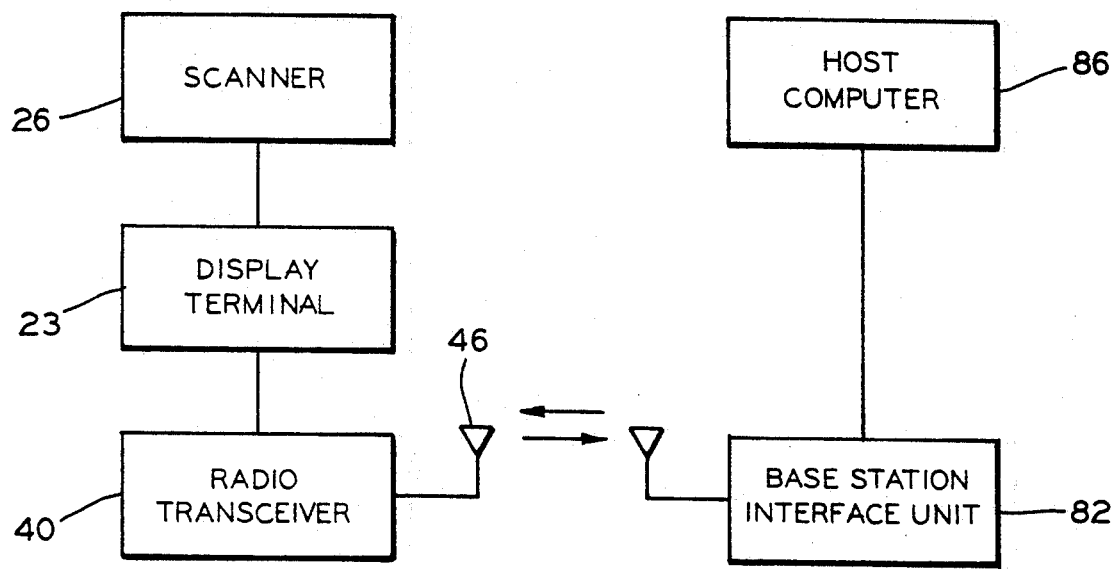
FIG. 10 is a schematic view of the system showing the radio transceivers providing communication between the host computer and the scanner and terminal.

Key pad 36 is attached to the top surface 19 and key pad 37 is attached to the side surface 20, the key pads providing letter and number keys and function keys for communicating with the host terminal (now shown). As shown on FIG. 3, the operator carries a battery power pack and radio transceiver 40 strapped to his belt. A cable 41 is connected between the power pack and a vertical edge 42 of the frame at a terminal 43. Internally of frame 16, one end of a cable 44 is connected to key pads 36 and 37 and to cable 41, and its other end is connected to the cable housing 32 and internally of scanner 26 to provide power and transmit signals. The scanner 26 so powered emits monochromatic light beams for scanning bar code 45, and the input obtained upon scanning bar code 45 is returned through the cable 44 to the radio transmitter of the unit 40 which transmits and receives signals via antenna 46 between a base station computer interface unit 82 (as shown in FIG. 10).

The interface unit is connected to a host computer 86. The scanner unit 26 is activated by depressing button 47 of a switch that is connected into the scanner to turn it "on" and "off". The scanner is turned "on" by the thumb depressing and holding the switch button 47. Switch 47 is mounted in the end 13 of the base support element 10 and includes lead wires (not shown) to and from the switch that connects it with the power circuit of scanner 26.

The bar code scanner of the invention in accordance with the embodiment of FIGS. 1-3, just described, allows an operator to wear element 10 on his forearm and with it the necessary components of key pads, LCD/LED display and thumb switch. Pointing the arm at an article in inventory and pressing the switch button on the element 10 reads the bar code and identifies the merchandise that is put into storage or taken from storage, which leaves the operator's hands free to perform other functions which were not available with the use of prior hand held units.

SECOND EMBODIMENT

Figure 4:
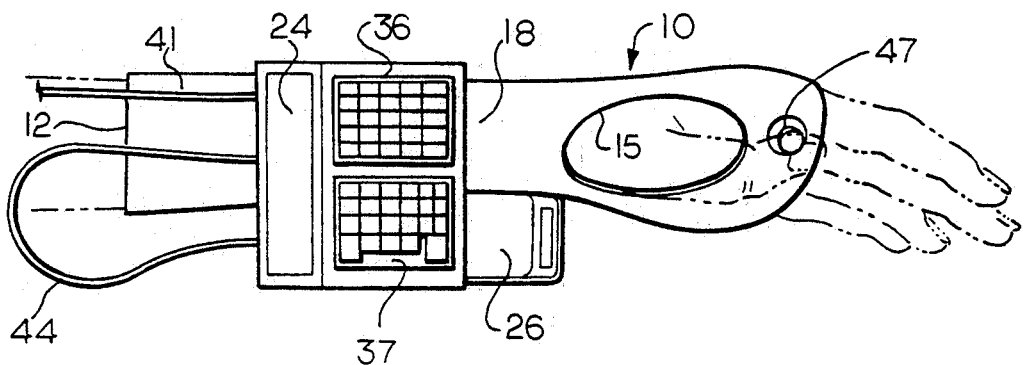
FIG. 4 is a plan view of a second embodiment of the invention.
Figure 5:
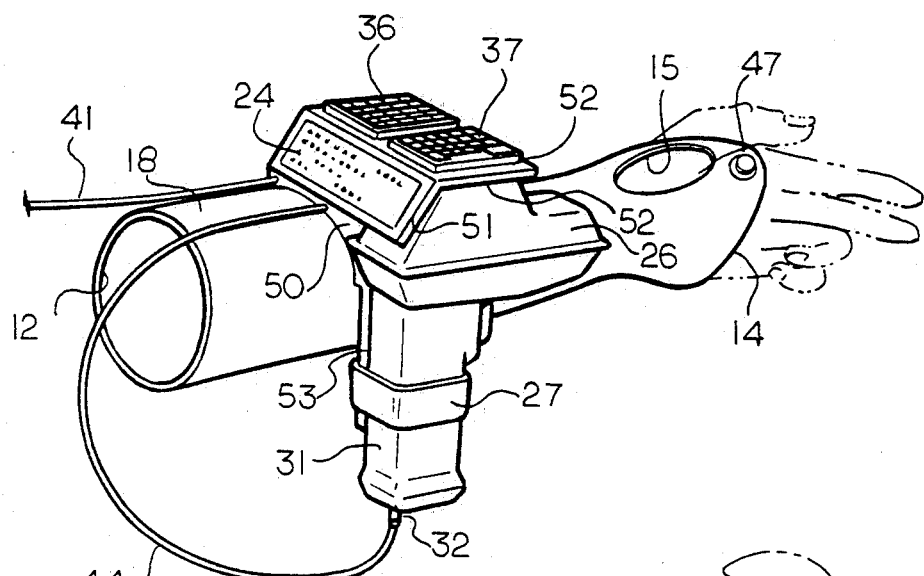
FIG. 5 is a perspective view of the second embodiment shown on FIG. 4.
Figure 6:
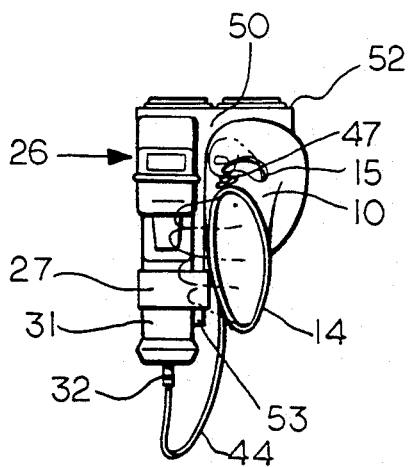
FIG. 6 is a front view of the embodiment shown on FIG. 4.

Another embodiment of the invention is shown on FIGS. 4-6, in which the same elements are identified by the same numbers used to describe the embodiment of FIGS. 1-3.

The frame 50 for the components is fastened onto the base support element 10 in a position intermediate the one open end 12 and the thumb opening 15. The top of frame 50 is constructed with a sloped rear face 51 and flat top surface 52. A LCD/LED tube 24 is attached to face 51 and key pads 36 and 37 are attached side by side on the top surface 52. The components 24, 36 and 37 are interconnected electrically for operation by cable 41. The frame 50 includes the vertical leg 53 that has a strap 27 for securing the grip 31 of the bar scanner 26. By contrast with the embodiment of FIGS. 1-2, the frame 50 is more compact, lengthwise of the arm, and displays the key pads 36 and 37 on one, top surface 52 of the holder. Adjacent thereto is the LCD/LED display for presenting visually information needed by the operator.

THIRD EMBODIMENT

Figure 7:
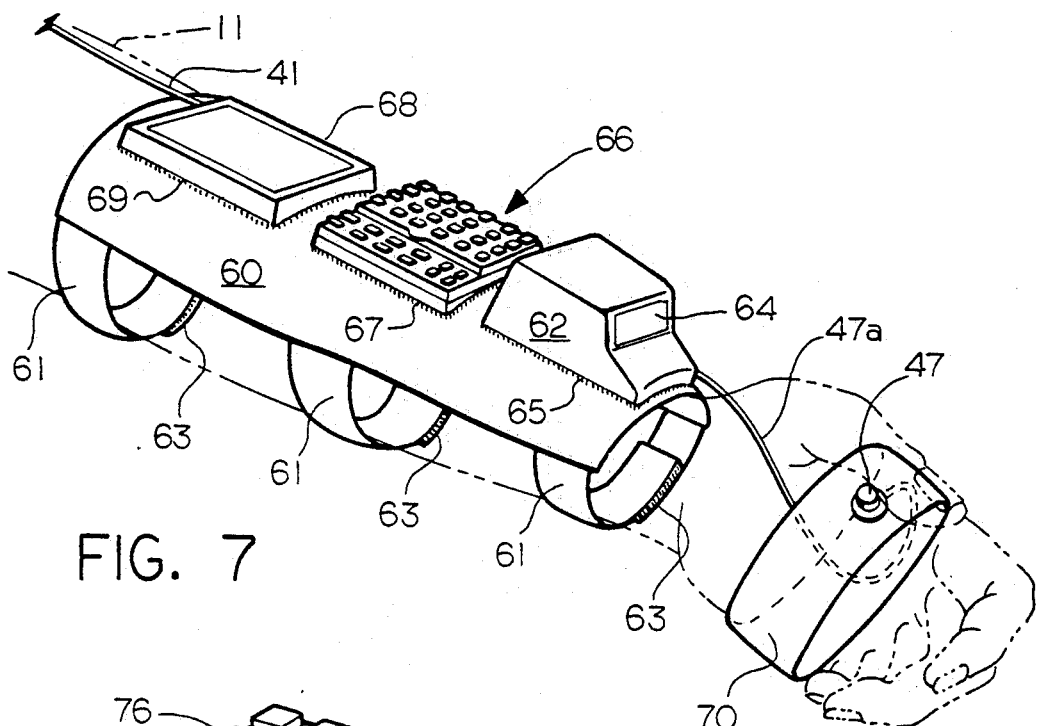
FIG. 7 is a perspective view showing a third embodiment of the invention.

On FIG. 7 there is illustrated another embodiment of the invention. This utilizes an upper support element 60 that is a surface wrapped partially on the arm 11 and is held in place by three flexible straps 61 attached at their ends to support element 60. The straps 61 have their free ends fastened around the arm and secured to each other by Velcro fastener means 63. At the forward part of element 60 is a scanner 62 which emits light signals to scan bar code information at the aperture 64. This is aimed at the bar code to be scanned by pointing the arm. Scanner 62 includes hook material on its undersurface and loop material is strategically held in the outer surface of element 60 to form a Velcro fastener means 65 for attaching scanner 62 on the upper surface of the arm held element 60.

Figure 8:
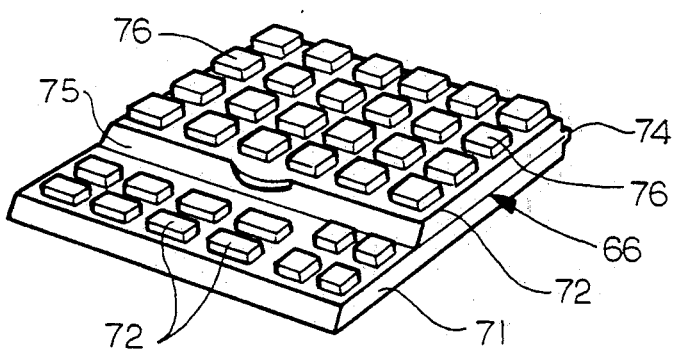
FIG. 8 is a perspective view of a two layer key pad of the invention that is fastened by Velcro fasteners onto the arm support of, FIG. 7.
Figure 9:
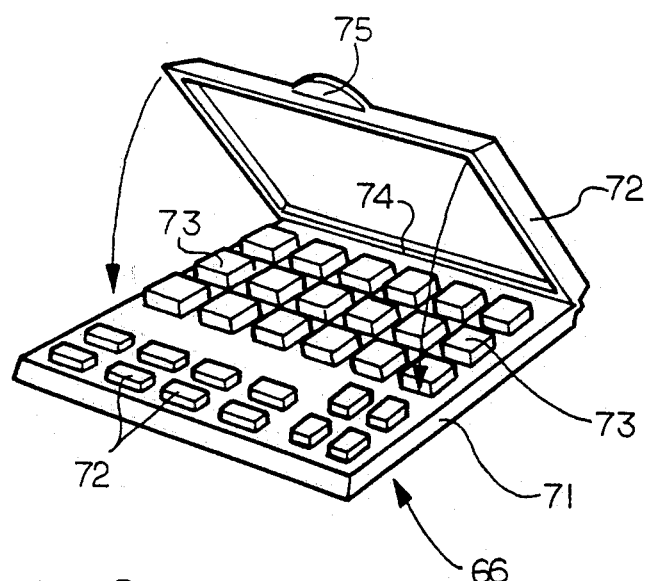
FIG. 9 is a perspective view of the key pad of FIG. 8 shown in its opened position permitting access to the first layer of keys.

Rearward of the scanner 62 is a compound key pad 66, which is shown in greater detail on FIGS. 8 and 9. The key pad 66 has a Velcro fastener means 67 consisting of J-hooks on the underside and loop material on the surface of element 60. To the rear of key pad 66 a LCD/LED display 68 is attached on the surface of element 60 by Velcro fastener means 69 such that the visual display on the LCD/LED 68 is facing upwardly into the sight of the operator. The bottom surfaces of both the LCD/LED 68 and the key pad 66 are contoured to follow the shape of the upper, exterior surface of the support element 60.

The scanner 62, key pad 66 and LCD/LED 68 have leads that are included in cable 41 that is connected to the powerpak and RF transceiver 40 (see FIG. 3). Scanner 62 is turned "on" by depressing switch 47 on the circuit of cable 47a that is connected to the scanner in a known manner. Switch 47 is fastened in a band 70 that is strapped around the palm of the hand of the operator and worn such that the switch 47 is in easy access of the thumb or a finger to be depressed as desired to scan a bar code indicated on an object in the area. Key pad 66 is a compound element consisting of a lower tier 71 of function keys 72 and either alphabet or number keys 73. The upper tier 72 is hinged along edge 74 and is lifted to have access to the keys 73 of the lower tier. The upper tier 72 is lifted by finger tab 75 on the frame of the upper tier. The keys 76 having most frequent usage are located on the upper tier 72, the lower keys 73 being those of lesser usage and are contained beneath the upper tier 72. This arrangement saves space on the arm mounting of the functioning components of the system and allows mounting the scanner 62 on the same top surface 60. Moreover, the arrangement just described allows for use of a larger area display 68 capable of displaying more information in easy to read format.

Preferred embodiments of the present invention have been shown and described herein, and it will be appreciated that other embodiments, modifications and variants are possible, and all such apparent embodiments, modifications and variants are to be regarded as being within the spirit and scope of the present invention.

What is claimed is:

1. A portable scanner system comprising:
   (a) a scanner means for reading coded information and generating scanner data signals;
   (b) a portable keyboard means for generating keyboard data signals;
   (c) a portable display means connected to said scanner means and said keyboard means for receiving data signals from said scanner means and said keyboard means and displaying data;
   (d) an elongate mounting sleeve for insertion on a forearm of an operator, said mounting sleeve including means for securing said scanner means, said keyboard means, and said display means to an outer surface of said mounting sleeve;
   (e) a portable radio transceiver for receiving and transmitting data signals, said portable transceiver being connected to said scanner means, said keyboard means and said display means whereby said portable radio transceiver transmits scanner data signals an keyboard data signals received from said scanner means and said keyboard means;
   (f) a second radio transceiver in two-way radio communication with said portable radio transceiver; and
   (g) a computer system for generating computer data signals, said computer system being connected to said second radio transceiver whereby the radio transceivers communicate computer data signals from said computer system to said portable display means, and communicate keyboard data signals and scanner data signals from said keyboard means and said scanner means to said computer system.

2. The system defined in claim 1 wherein said elongate mounting sleeve for insertion on a forearm of an operator is made from a pliable material.

3. The system defined in claim 2 wherein said elongate mounting sleeve includes a thumb aperture and scanner switch at one end of said sleeve, the scanner switch selectively operating said scanner means to read coded information.

4. The system defined in claim 2 wherein said display means and said mounting sleeve include means for detachably securing said display means to said mounting sleeve.

5. The system defined in claim 1 wherein said display means includes a display terminal whereby computer data, scanner data, and keyboard data signals received or transmitted by said portable radio transceiver are displayed.

6. The system defined in claim 2 wherein said keyboard means and said mounting sleeve include means for detachably securing said keyboard means to said mounting sleeve.

7. The system defined in claim 1 wherein said keyboard means includes at least one alphanumeric keyboard connected to said radio transceiver.

8. The system defined in claim 1 wherein said keyboard means includes an alphabetical keyboard and a separate numeric keyboard.

9. The system defined in claim 2 wherein said scanner means and said mounting sleeve include means for detachably securing said scanner means to said mounting sleeve.

10. The system defined in claim 2 wherein said scanner means includes a bar code scanner.

11. The system defined in claim 10 wherein said bar code scanner is sighted longitudinally along said mounting sleeve toward the thumb aperture.

12. The system defined in claim 2 including a portable power source connected to said scanner means, said display means, and said portable radio transceiver.

13. The system defined in claim 12 including a power cable and supporting means for positioning said portable power source and said portable radio transceiver on an operator apart from an operating area of said scanner means mounted on said sleeve.

14. The system defined in claim 13 wherein said supporting means includes a belt for securing said radio transceiver to a back of an operator.

15. The system defined in claim 11 wherein said computer system includes a means for receiving data signals from said scanner and transmitting computer data signals to said display means through said portable transceiver and said second radio transceiver.

16. A portable scanner system comprising:
   (a) a bar code scanner for reading coded information and generating scanner data signals;
   (b) a keyboard for generating keyboard data signals;
   (c) a display terminal connected to said scanner and said keyboard for receiving data signals from said scanner and said keyboard and displaying information;
   (d) an elongate mounting sleeve for insertion on a forearm of an operator, said mounting sleeve including means for detachably securing said scanner, said keyboard and said display terminal to said sleeve;
   (e) a portable radio transceiver for receiving and transmitting data signals, said transceiver being connected to said scanner, said keyboard, and said display terminal whereby said portable radio transceiver transmits scanner data signals and keyboard data signals received from said scanner means and said keyboard means;

(f) a portable power source connected to said scanner, said display terminal, said keyboard, and said radio transceiver;

(g) a second radio transceiver in two-way radio communication with said portable radio transceiver;

(h) a computer interface connected to said second radio transceiver; and (i) a computer system for generating computer data signals, said computer system being connected to said second radio transceiver through said computer interface whereby the radio transceivers communicate computer data signals form said computer system to said display terminal, and communicate keyboard data signals and scanner data signals from said keyboard and said scanner to said computer system.

17. A portable scanner system for two way communication with a host computer, which generates computer data signals, connected to a base station transceiver, said portable scanner system comprising:

(a) a scanner means for reading coded information and generating scanner data signals;

(b) a keyboard means for generating keyboard data signals;

(c) a display means connected to said scanner means and said keyboard means for receiving data signals from said scanner means and said keyboard means and displaying data;

(d) an elongate mounting sleeve provided with means for securing said scanner means, said keyboard means, and said display means to an outer surface of said mounting sleeve; and (e) a portable radio transceiver for receiving and transmitting data signals, said transceiver being connected to said scanner means, said keyboard means and said display means, and being in two way radio communication with the base station transceiver, whereby computer data signals are communicated from the host computer to said display means; and scanner data signals and keyboard data signals are communicated from said keyboard means and said scanner means to the host computer.

* * * * *